US010857881B2

(12) United States Patent
Kumar

(10) Patent No.: US 10,857,881 B2
(45) Date of Patent: Dec. 8, 2020

(54) ELECTRIC DRIVETRAIN FOR A TANDEM DRIVE AXLE

(71) Applicant: Dana Heavy Vehicle Systems Group, LLC, Maumee, OH (US)

(72) Inventor: Krishna Kumar, Holland, OH (US)

(73) Assignee: DANA HEAVY VEHICLE SYSTEMS GROUP, LLC, Maumee, OH (US)

(*) Notice: Subject to any disclaimer, the term of this patent is extended or adjusted under 35 U.S.C. 154(b) by 0 days.

(21) Appl. No.: 15/813,421

(22) Filed: Nov. 15, 2017

(65) Prior Publication Data
US 2018/0134153 A1    May 17, 2018

Related U.S. Application Data

(60) Provisional application No. 62/422,264, filed on Nov. 15, 2016.

(51) Int. Cl.
*B60K 23/08*    (2006.01)
*B60K 17/36*    (2006.01)
(Continued)

(52) U.S. Cl.
CPC ............ *B60K 17/36* (2013.01); *B60B 35/125* (2013.01); *B60K 7/0007* (2013.01); *B60K 17/02* (2013.01);
(Continued)

(58) Field of Classification Search
CPC ..... B60B 35/125; B60B 35/14; F16H 37/082; F16H 48/08; B60K 17/36; B60K 17/16;
(Continued)

(56) References Cited

U.S. PATENT DOCUMENTS 3,799,284 A    3/1974  Hender
4,875,978 A *  10/1989 Hiketa ............... B60K 17/3462
                                                        180/248
(Continued)

FOREIGN PATENT DOCUMENTS

DE    102005062874    7/2007
EP        1232892       8/2002
(Continued)

*Primary Examiner* — Roger L Pang
(74) *Attorney, Agent, or Firm* — McCoy Russell LLP

(57) ABSTRACT

Provided herein is an electric tandem axle having a first drive axle assembly having a first differential assembly drivingly engaged with a first drive axle; a second axle drive assembly having a second drive axle drivingly engaged with a second differential assembly having a first axle output shaft and a second axle output shaft and an axle disconnect clutch; an inter-axle assembly is drivingly connected to the first axle drive assembly and the second axle drive assembly; a motor-generator in driving engagement with the first and second drive axle assemblies; a planetary drive unit including a selection clutch in driving engagement with the first differential assembly, the inter-axle assembly and the motor-generator; and a controller connected to the motor-generator, selection clutch and axle disconnect clutch. The controller is configured to selectively engage and disengage the selection clutch and axle disconnect clutch to facilitate different modes of operation.

15 Claims, 4 Drawing Sheets

(51) Int. Cl.
*B60B 35/12* (2006.01)
*F16H 48/08* (2006.01)
*B60K 7/00* (2006.01)
*B60K 17/02* (2006.01)
*F16H 37/08* (2006.01)
*B60K 17/16* (2006.01)
*B60B 35/14* (2006.01)

(52) U.S. Cl.
CPC ............ *B60K 17/16* (2013.01); *B60K 17/165* (2013.01); *B60K 23/08* (2013.01); *F16H 37/082* (2013.01); *F16H 48/08* (2013.01); *B60B 35/14* (2013.01); *B60K 2023/0858* (2013.01); *B60Y 2200/1422* (2013.01); *B60Y 2200/91* (2013.01)

(58) Field of Classification Search
CPC .... B60K 17/165; B60K 17/02; B60K 7/0007; B60K 23/08
USPC .................. 475/221, 222, 202, 204; 180/248
See application file for complete search history.

(56) References Cited

U.S. PATENT DOCUMENTS

| | | | |
|---|---|---|---|
| 5,168,946 A | 12/1992 | Dorgan | |
| 5,845,731 A | 12/1998 | Buglione | |
| 5,902,205 A * | 5/1999 | Williams | B60K 17/3467 180/248 |
| 6,001,041 A * | 12/1999 | Sawase | B60K 17/3462 475/198 |
| 6,295,487 B1 | 9/2001 | Ono | |
| 6,295,847 B1 | 10/2001 | Zeren | |
| 6,644,247 B2 | 11/2003 | Campion | |
| 6,644,427 B2 | 11/2003 | Schulte | |
| 6,740,002 B1 | 5/2004 | Stridsberg | |
| 6,953,408 B2 | 10/2005 | Thompson | |
| 7,174,978 B2 | 2/2007 | Taniguchi | |
| 7,255,187 B2 | 8/2007 | Bell | |
| 7,507,178 B2 | 3/2009 | Rosemeier | |
| 7,520,354 B2 | 4/2009 | Morrow | |
| 7,520,534 B2 | 4/2009 | Longchamp | |
| 7,607,505 B2 | 10/2009 | Yang | |
| 7,742,852 B1 | 6/2010 | Tang | |
| 8,011,461 B2 | 9/2011 | Rodriguez | |
| 8,562,479 B2 | 10/2013 | Hamperl | |
| 8,944,194 B2 | 2/2015 | Glaser | |
| 9,162,586 B2 | 10/2015 | Tang | |
| 9,222,530 B2 | 12/2015 | Duraiswamy | |
| 9,283,843 B2 | 3/2016 | Ziech | |
| 9,579,975 B2 | 2/2017 | Ekonen | |
| 2003/0205422 A1 | 11/2003 | Morrow | |
| 2004/0050597 A1 | 3/2004 | Ai | |
| 2005/0109549 A1 | 5/2005 | Morrow | |
| 2005/0266953 A1 | 12/2005 | Puiu | |
| 2007/0038340 A1 | 2/2007 | Sekiguchi | |
| 2009/0205422 A1 | 8/2009 | Caron | |
| 2009/0242289 A1 | 10/2009 | Murty | |
| 2009/0321153 A1 | 12/2009 | Boeckenhoff | |
| 2010/0282530 A1 | 11/2010 | Wang | |
| 2011/0120788 A1 | 5/2011 | Wang | |
| 2011/0259657 A1 | 10/2011 | Fuechtner | |
| 2012/0260758 A1 * | 10/2012 | Arai | B60K 17/348 74/405 |
| 2013/0017927 A1 * | 1/2013 | Morscheck | B60K 17/16 477/35 |
| 2013/0150197 A1 | 6/2013 | Lee | |
| 2014/0116793 A1 | 5/2014 | Pelletier | |
| 2014/0190758 A1 | 7/2014 | Osborn | |
| 2015/0211616 A1 | 7/2015 | Yang | |
| 2015/0375619 A1 * | 12/2015 | Ziech | B60K 17/16 475/221 |

FOREIGN PATENT DOCUMENTS

| | | |
|---|---|---|
| EP | 2574490 | 4/2013 |
| EP | 2574491 | 4/2013 |
| EP | 2705968 | 3/2014 |
| EP | 2902234 | 8/2015 |
| EP | 2927036 | 10/2015 |
| FR | 2746352 | 9/1997 |
| JP | 2005081930 | 3/2005 |

* cited by examiner

ELECTRIC DRIVETRAIN FOR A TANDEM DRIVE AXLE

RELATED APPLICATION

The present application claims the benefit of U.S. Provisional Application No. 62/422,264 filed on Nov. 15, 2016 which is incorporated herein by reference in its entirety.

BACKGROUND

Commercial vehicles or trailers having two or more rear axles allow such vehicles to carry greater loads when compared to vehicles and trailers having a single axle. Further, tractive effort and load distribution can be increased in these vehicles.

Electric drivetrains that incorporate a motor and a battery are an alternative option for conventional drivetrain powered using fossil fuels. Currently, few options for electric drivetrains for commercial vehicles are available. Because of the unique demands of commercial vehicles, such as the need for a low speed, high torque mode of operation while also having a high speed, low torque mode of operation, many challenges exist in successfully implementing an electric drivetrain for use with commercial vehicles. Further, regulations posed by governments increasingly demand fuel efficiency improvements for such vehicles. Additionally, such electric drivetrains can be retrofitted into current commercial vehicles to increase an efficiency of a drivetrain.

It would be advantageous to develop an electric drivetrain for commercial vehicles that meets the exacting needs of commercial vehicles while providing efficiency improvements and options for retrofitting for vehicles that incorporate the electric drivetrain.

SUMMARY

Provided herein is an electric tandem axle having a first drive axle assembly having a first differential assembly and a first drive axle having a first axle output shaft and a second axle output shaft, wherein the first differential assembly drivingly engaged with the first axle output shaft and the second axle output shaft of the first drive axle; a second axle drive assembly having a second drive axle having a first axle output shaft and a second axle output shaft, a second differential assembly drivingly engaged with the first axle output shaft and the second axle output shaft of the second drive axle and an axle disconnect clutch; an inter-axle assembly is drivingly connected to the first axle drive assembly and the second axle drive assembly; a motor-generator in driving engagement with the first and second drive axle assemblies; a planetary drive unit including a selection clutch, the planetary drive unit in driving engagement with the first differential assembly, the inter-axle assembly and the motor-generator; and a controller connected to the motor-generator, selection clutch and axle disconnect clutch. The controller is configured to selectively engage and disengage the selection clutch and axle disconnect clutch to facilitate different modes of operation.

BRIEF DESCRIPTION OF THE DRAWINGS

Novel features of the preferred embodiments are set forth with particularity in the appended claims. A better understanding of the features and advantages of the present embodiments will be obtained by reference to the following detailed description that sets forth illustrative embodiments, in which the principles of the devices are utilized, and the accompanying drawings of which:

DETAILED DESCRIPTION OF THE PREFERRED EMBODIMENTS

It is to be understood that the preferred embodiments may assume various alternative orientations and step sequences, except where expressly specified to the contrary. It is also to be understood that the specific devices and processes illustrated in the attached drawings, and described in the following specification are simply exemplary embodiments of the concepts defined herein. Hence, specific dimensions, directions or other physical characteristics relating to the embodiments disclosed are not to be considered as limiting, unless expressly stated otherwise.

Figure 1:
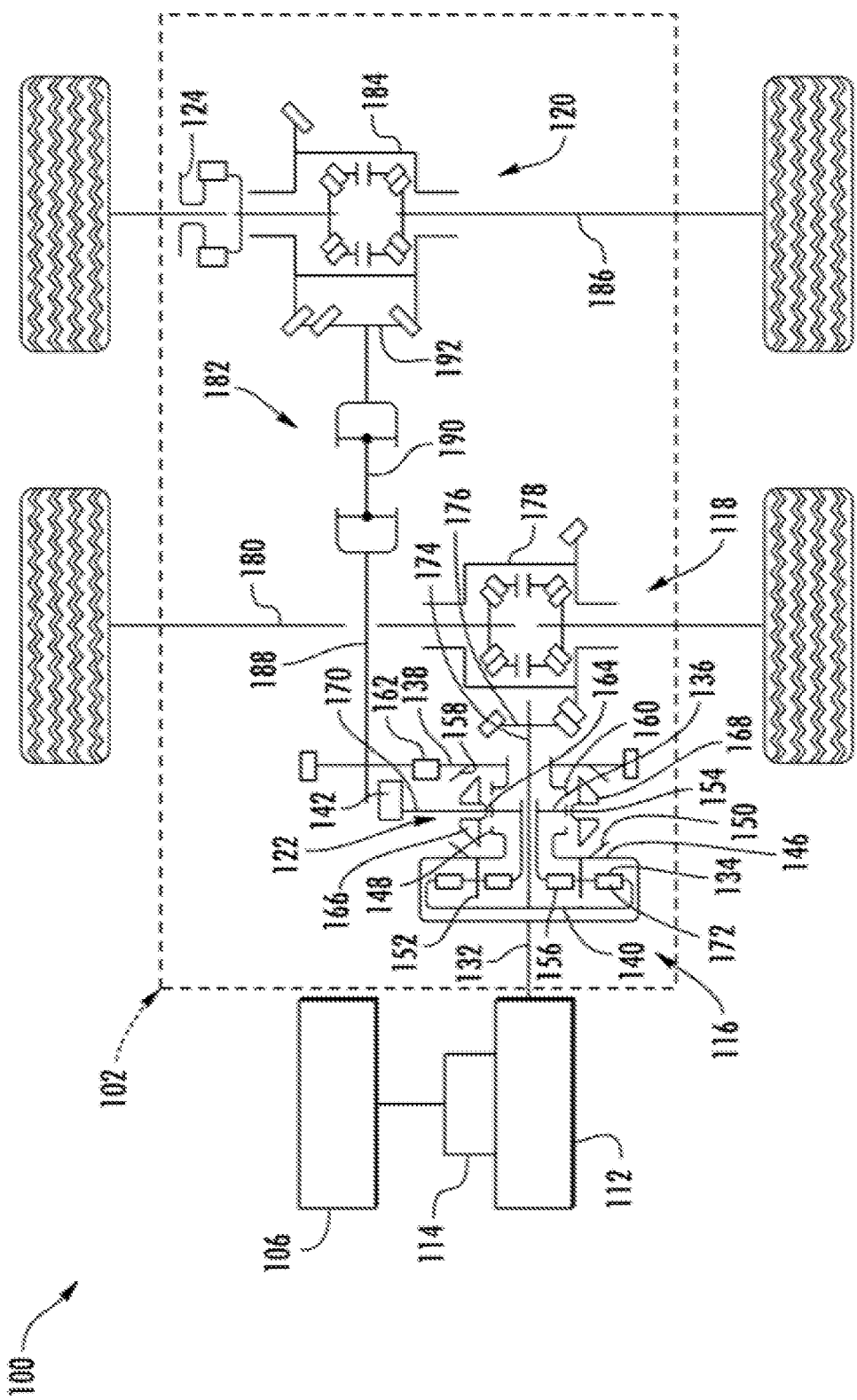
FIG. 1 is a schematic style view of an electric drivetrain according to a preferred embodiment.

FIG. 1 depicts an electric driveline 100 according to a preferred embodiment. The electric driveline 100 includes a tandem axle drive unit 102 with an electric machine and inverter unit 112 and a battery pack 106. The battery 106 is in electrical communication with the electric tandem axle drive unit 102. In some embodiments, the battery pack 106 is replaced by or supplemented with an ultra-capacitor.

In some embodiments, the electric driveline 100 includes a motor-generator 112, a controller 114, a planetary drive unit or inter-axle differential 116, a first axle drive assembly 118, and a second axle drive assembly 120. The electric driveline 100 is configured to be placed in at least two modes of operation, depending on a position of a selection clutch 122 of the planetary drive unit 116. In a first mode of operation, the electric tandem axle drive unit 102 operates in a high torque, dual axle mode operation. In a second mode of operation, the electric tandem axle drive unit 102 operates in a low torque, single axle mode operation. As shown in FIG. 1, in some embodiments the electric driveline 100 includes an axle disconnect clutch 124 forming a portion of the second axle drive assembly 120. In some embodiments, the electric drivetrain unit 102 is a primary unit in an electric of hybrid electric vehicle. In some embodiments, the electric drivetrain unit 102 is a secondary unit in an electric or hybrid electric vehicle.

The motor-generator 112 is in driving engagement with the planetary drive unit 116. The motor-generator 112 is in electrical communication with a controller (not shown) and the battery 106. Depending on an electrical control of the motor-generator 112 using the controller, the motor-generator 112 may apply force to or retard the portion of the electric driveline 100 it is drivingly engaged with. In some embodiments, the motor-generator 112 includes additional components to facilitate operation and increased functionality of the motor-generator 112 such as, but not limited to, an inverter, power electronics for control of the motor-generator 112, a DC-DC converter, or electronics used for a generator function. It is also understood that in some embodiments the motor-generator 112 includes at least a portion of a cooling system used for electrical components.

The controller is in electrical communication with at least the motor-generator 112 and the battery 106. In some embodiments, the controller may be a hybrid supervisory controller with dual range disconnect control management. It is understood that the controller may also be in communication with at least one of the planetary drive unit 116, the axle disconnect clutch 124 of the electric tandem axle drive unit 102, a vehicle controller (not shown), an engine controller (not shown), a braking controller (not shown), another type of controller, an advanced driver assistance system (ADAS), or an automated driving controller.

The controller controls an operating mode of the electric tandem axle drive unit 102 by at least adjusting a position of the selection clutch 122 of the planetary drive unit 116, by communicating with a transmission controller (not shown), by controlling the axle mode, by controlling the motor-generator 112, and by adjusting a position of the axle disconnect clutch 124 to apply force to or retard portions of the electric driveline 100 each are respectively drivingly engaged with. In some embodiments, the controller receives inputs/signals relating to the various environmental conditions including, but not limited to, the condition of the surface the vehicle is traversing or operating on, etc. to facilitate selection of an operating mode.

In some embodiments, the planetary drive unit 116 includes an input shaft 132, a plurality of driving pinions 134, a transfer shaft 136, a second output gear 138, a first output gear 140, and the selection clutch 122. Preferably, the components 132, 134, 136, 138, 140, 122 are formed from a hardened steel; however, the components 132, 134, 136, 138, 140, 122 may be formed from any other rigid material. As shown, in some embodiments, the planetary drive unit 116 includes the six components 132, 134, 136, 138, 140, 122 disposed in a housing 141. In some embodiments, the planetary drive unit 116 may include fewer or more components. In some embodiments, the planetary drive unit 116 is replaced with a bevel gear differential unit resulting in a single speed electric tandem axle arrangement with disconnect instead of a dual range disconnect system as shown in FIG. 1. In response to a signal sent by the controller, an actuator 142 adjusts a position of the selection clutch 122.

The input shaft 132 is at least partially disposed in a housing (not shown). Preferably, the input shaft 132 is an elongate member; however, the input shaft 132 may be any other shape. Bearings 144 are disposed between the input shaft 132 and the housing permit the input shaft 132 to rotate about an axis of the input shaft 132. The input shaft 132 has a first end portion drivingly engaged with the motor-generator 112 and a second end portion having a pinion carrier 146, a first set of clutch gear teeth 148, and an engagement portion 150 formed thereon. In some embodiments, the input shaft 132 is not needed where the motor-generator 112 is directly connected to the second end portion having the pinion carrier 146. In some embodiments, the second end portion is a substantially hollow body having a diameter greater than a diameter of the first end portion. The second end portion is drivingly coupled to the input shaft 132. In some embodiments, the second end portion may be integrally formed with the input shaft 132.

In some embodiments, the pinion carrier 146 is a substantially disc shaped body drivingly coupled to the second end portion of the input shaft 132. The pinion carrier 146 includes a plurality of pinion supports 152 protruding from a first side of the pinion carrier 146 into the second end portion of the input shaft 132. The engagement portion 150 is formed on a second side of the pinion carrier 146. The pinion carrier 146 can also be referred to as the planet carrier.

In some embodiments, the engagement portion 150 is a conical surface oblique to the input shaft 132; however, the engagement portion 150 may have any other shape. The first set of clutch gear teeth 148 are formed on the pinion carrier 146 radially inward from the engagement portion 150.

The plurality of driving pinions 134 are rotatably coupled to the pinion supports 152. Each of the driving pinions 134 has a set of gear teeth formed on an outer surface thereof. The driving pinions 134 are also referred to as a planet gear. Preferably, bearings are disposed between each of the driving pinions 134 and the pinion supports 152; however, the driving pinions 110 may be directly mounted on the pinion supports.

The transfer shaft 136 is a shaft rotatably disposed in the housing and having an axis of rotation concurrent with the axis of rotation of the input shaft 132. In some embodiments, the transfer shaft 136 is a hollow elongate cylindrical member; however the transfer shaft 136 may be any other shape. Bearings (not shown) disposed between the transfer shaft 136 and pinion carrier 146 permit the transfer shaft 136 to rotate about an axis of the transfer shaft 136. The transfer shaft 136 has a first end portion having a first set of clutch gear teeth 154 formed on an outer surface thereof, and a second end portion having a second set of gear teeth 156 formed on an outer surface thereof. In some embodiments, the first end portion and the second end portion are integrally formed with the transfer shaft 136 and have a diameter substantially equal to the transfer shaft 136. In some embodiments, the first end portion and the second end portion may be substantially disc shaped bodies having an outer diameter greater than a diameter of the transfer shaft 136. The first end portion and the second end portion may be drivingly coupled to the transfer shaft 136. Similarly, the first set of clutch gear teeth 154 and the second set of gear teeth 156 may be formed directly in the transfer shaft 136. The second end portion having the gear teeth 156 also referred to as the sun gear. The second set of gear teeth 156 are engaged with the plurality of driving pinions 134 and the first set of clutch gear teeth 154 are disposed adjacent the first set of clutch gear teeth 148 of the pinion carrier 146.

The second output gear 138 is a gear concentrically disposed about a portion of the transfer shaft 136. The second output gear 138 has a central perforation having a diameter greater than a diameter of the transfer shaft 136. The second output gear 138 is a substantially disc shaped body having a first end portion, a second end portion defining an outer diameter of the second output gear 138, and an engagement portion 158. Bearings disposed between the second output gear 138 and the housing permit the second output gear 138 to rotate about an axis of the second output gear 138. The axis of the second output gear 138 is concurrent with the axis of the input shaft 132. A first set of clutch gear teeth 160 are formed on the first end portion adjacent the first set of clutch gear teeth 154 of the transfer shaft 136. A second set of gear teeth 162 are formed on the second end portion. The engagement portion 158 is formed in the second output gear 138 intermediate the first end portion and the second end portion. As shown, in some embodiments the engagement portion 158 is a conical surface oblique to the input shaft 132; however, the engagement portion 158 may have any other shape.

The selection clutch 122 is concentrically disposed about the transfer shaft 136. The selection clutch 122 includes a set of inner clutch collar teeth 164 formed on an inner surface thereof, a first synchronizer ring 166, and a second synchronizer ring 168. In some embodiments, the second synchronizer ring 168 is a cone clutch that is used in conjunction with a dog clutch, wherein shifting the selection clutch 122 utilizes a torque interrupt shift. In some embodiments, the selection clutch 122 is replaced with a dog style clutch that does not utilize synchronizers, requiring the electric driveline 100 to be placed in a non-moving state before the selection clutch 122 can be moved. The set of inner clutch collar teeth 164 are engaged with the first set of clutch gear teeth 154 of the transfer shaft 136. The selection clutch 122 is slidably moved along the axis of the input shaft 132 as directed by the controller while maintaining engagement of the inner clutch collar teeth 164 and the first set of clutch gear teeth 154. A shift fork 170 disposed in an annular recess formed in the selection clutch 122 moves the selection clutch 122 along the axis of the input shaft 132 into a first position, a second position, or a neutral position. The actuator 142, which is drivingly engaged with the shift fork 170, is engaged to position the shift fork 170 as directed by the controller. The shift fork 170 positions the selection clutch 122 into the first position, the second position, or the neutral position. In the first position, the selection clutch 122 is drivingly engaged with the first set of clutch gear teeth 154 of the transfer shaft 136 and the first set of clutch gear teeth 148 of the pinion carrier 146. In the second position, the selection clutch 122 is drivingly engaged with the first set of clutch gear teeth 154 of the transfer shaft 136 and the first set of clutch gear teeth 160 of the second output gear 138. In the neutral position, the inner clutch collar teeth 164 of the selection clutch 122 are only drivingly engaged with the first set of clutch gear teeth 154 of the transfer shaft 136. In some embodiments, the selection clutch 122, the clutch gear teeth 154, 148, 160, 164, the synchronizer rings 166, 168, and the engagement portions 150, 158 may be substituted with any clutching device that permits selective engagement of a driving and a driven part.

The first synchronizer ring 166 is an annular body coupled to the selection clutch 122 adjacent the engagement portion 150 of the pinion carrier 146. In some embodiments, the first synchronizer ring 166 has a first conical engagement surface. In some embodiments, the first synchronizer ring 166 has an engagement surface having any other shape. A biasing member (not shown) is disposed between the selection clutch 122 and the first synchronizer ring 166 to urge the first synchronizer ring 166 away from the selection clutch 122. When the selection clutch 122 is moved from the second position into the first position, the first conical engagement surface contacts the engagement portion 150 of the pinion carrier 146. As the selection clutch 122 moves towards the first set of clutch gear teeth 148 of the input shaft 132, the biasing member is compressed while the selection clutch 122 engages the first set of clutch gear teeth 148 of the transfer shaft 136 and before the selection clutch 122 engages the first set of clutch gear teeth 148 of the pinion carrier 146.

The second synchronizer ring 168 is an annular body coupled to the selection clutch 122 adjacent the first end portion of the second output gear 138. In some embodiments, the second synchronizer ring 168 has a second conical engagement surface. In some embodiments, the second synchronizer ring 138 has an engagement surface having any other shape. A biasing member (not shown) is disposed between the selection clutch 122 and the second synchronizer ring 168 to urge the second synchronizer ring 168 away from the selection clutch 122. When the selection clutch 122 is moved from the first position into the second position, the second conical engagement surface contacts the engagement portion 158 of the second output gear 138. As the selection clutch 122 moves towards the first set of clutch gear teeth 160 of the second output gear 138, the biasing member is compressed while the selection clutch 122 engages the first set of clutch gear teeth 154 of the transfer shaft 136 and before the selection clutch 122 engages the first set of clutch gear teeth 160 of the second output gear 138. In some embodiments, the synchronizer assembly is not required and the motor-generator provides the synchronization capability when it functions as a motor.

The first output gear 140 is a gear concentrically disposed within the second end portion of the input shaft 132. The first output gear 140 is a substantially cup shaped body having an inner surface having gear teeth 172 formed on. The first output gear 140 is also referred to as a ring gear. The gear teeth 172 are engaged with the gear teeth formed on the outer surface of each of the driving pinions 134. In some embodiments, the first output gear 140 includes an output shaft 174 and first axle drive pinion 176 drivingly coupled thereto. In some embodiments, the first output gear 140 is integrally formed with the output shaft 174. The output shaft 174 is collinear with the input shaft 132. Bearings disposed between the output shaft 174 and the housing support the output shaft 174 and permit the output shaft 174 to rotate about an axis of the output shaft 174. In some embodiments, the first axle drive pinion 176 is a spiral bevel gear the facilitates driving engagement between the axle output shaft 174 and the first axle drive assembly 118; however, it is understood that other type of gears may be used.

The first axle drive assembly 118 includes a first differential assembly 178 and a first drive axle 180. The first differential assembly 178 and the first drive axle 180 are at least partially disposed in a first axle housing (not shown). In some embodiments, the first differential assembly 178 is a conventional differential assembly including a ring gear, differential housing, drive pinions, and side gears as known in the art. The side gears of the first differential assembly 178 are respectively drivingly engaged with a first axle output shaft and the second axle output shaft of the first drive axle 180. The ring gear of the first differential assembly 178 is drivingly engaged with the first axle drive pinion 176 to facilitate driving engagement between the first output gear 140 and the differential assembly.

The second axle drive assembly 120 includes an inter-axle assembly 182, a second differential assembly 184, a second drive axle 186, and the axle disconnect clutch 124. The second differential assembly 184, the second drive axle 186, and the axle disconnect clutch 124 are at least partially disposed in a second axle housing (not shown). The inter-axle assembly 182 includes a geared shaft 188 in driving engagement with the second output gear 138, a Cardan shaft 190 in driving engagement with the geared shaft 188, and a second axle drive pinion 192 in driving engagement with the Cardan shaft 190. The second differential assembly 184 is a conventional differential assembly including a ring gear, differential housing, drive pinions, and side gears as known in the art. The side gears of the second differential assembly 184 are respectively drivingly engaged with a first axle output shaft and the second axle output shaft of the second drive axle 186. The ring gear of the second differential assembly 184 is drivingly engaged with the inter-axle assembly 182 to facilitate driving engagement between the second output gear 138 and the second differential assembly 184. In some embodiments, the second drive axle 186 includes the first axle output shaft and the second axle output shaft. The first axle output shaft and the second axle output shaft are divided into two portions by disengaging the axle disconnect clutch 124. By disengaging the axle disconnect clutch 124, the inter-axle assembly 182 and the second differential assembly 184 are prevented from being backdriven when the electric tandem axle drive unit 102 is placed in a single axle mode of operation.

In some embodiments, the battery 106 is a rechargeable, electrochemical energy storage device in electrical communication with the hybrid supervisory controller or any other vehicle controllers and the motor-generator 112 and other vehicle electrical systems. In some embodiments, the battery 106 is in electrical communication with other components of the electric driveline 100 or the vehicle to supply power thereto. Further, it is understood that the battery 106 may be another type of electrical storage, such as a supercapacitor. In response to the controller adjusting an operating mode of the electric driveline 100, the battery 106 may be charged or discharged. In some embodiments, the battery 106 includes at least a portion of a cooling system used for electrical components.

In use, through control of motor-generator 112, the selection clutch 122, and the axle disconnect clutch 124, driving and charging can occur using all or a portion of the electric driveline 100. The electric driveline 100 may be operated in a plurality of operating modes as described hereinbelow. The motor-generator 112 is used to power the electric driveline 100 by applying force to the planetary drive unit 116 or to recuperate the braking energy via the electric driveline 100 by applying torque to the planetary drive unit 116 or receiving torque from the drive axles 180, 186 via the planetary drive unit 116.

Through the addition of the motor-generator 112, the controller, and the battery 106, a conventional driveline may be retrofitted to form the electric driveline 100. The electric driveline 100 provides the functionality of a two speed electric gearbox, with the electric motor capable of providing the synchronization functionality. If the electric driveline 100 is used in a commercial vehicle, in the low mode of operation, a 6×4 drive mode is enabled such that power (electric or hybrid electric) flows to all wheels of the tandem axle to enable an all all-wheel drive capability, whereas in the 6×2 mode, the power flows only to the front wheels of the tandem. The availability of multiple ratios enables high speed and low speed capability in the driveline 100. The shift from low speed to high speed mode can be based on vehicle velocity/average wheel speeds, motor speed, road conditions (such as grade), engine speed in a hybrid electric vehicle embodiment, state of charge of the battery or a combination thereof.

In the 6×4 mode, when the planetary drive unit 116 is functioning as a differential transmission, the motor-generator 112 provides only assist and regeneration functionalities. When the motor-generator 112 is not connected to the second axle drive assembly 120 and it does provide electric synchronization capabilities during the transition from 6×2 mode to 6×4 mode prior to engagement of the axle disconnect clutch 124.

In some embodiments, the engine can be selectively disconnected from driveline 100 through the use of a clutch allowing the motor-generator 112 to function as a synchronizer. In some embodiments, the clutch is an automated manual transmission clutch. The motor-generator 112 can function as a synchronizer and the motor-generator 112 is used as a speed controller and run at a set point speed such that the planetary node tied to the second drive axle comes up to wheel speed. When the one of the planetary nodes of the planetary drive unit 116 is free, the electric driveline 100 functions in a neutral mode with no power being supplied to the wheels. When both the planetary drive unit 116 and the axle disconnect clutch 124 are disengaged, a double neutral mode is enabled. In the neutral or double neutral modes, the motor-generator 112 cannot provide any assist or regeneration capabilities.

Figure 2:
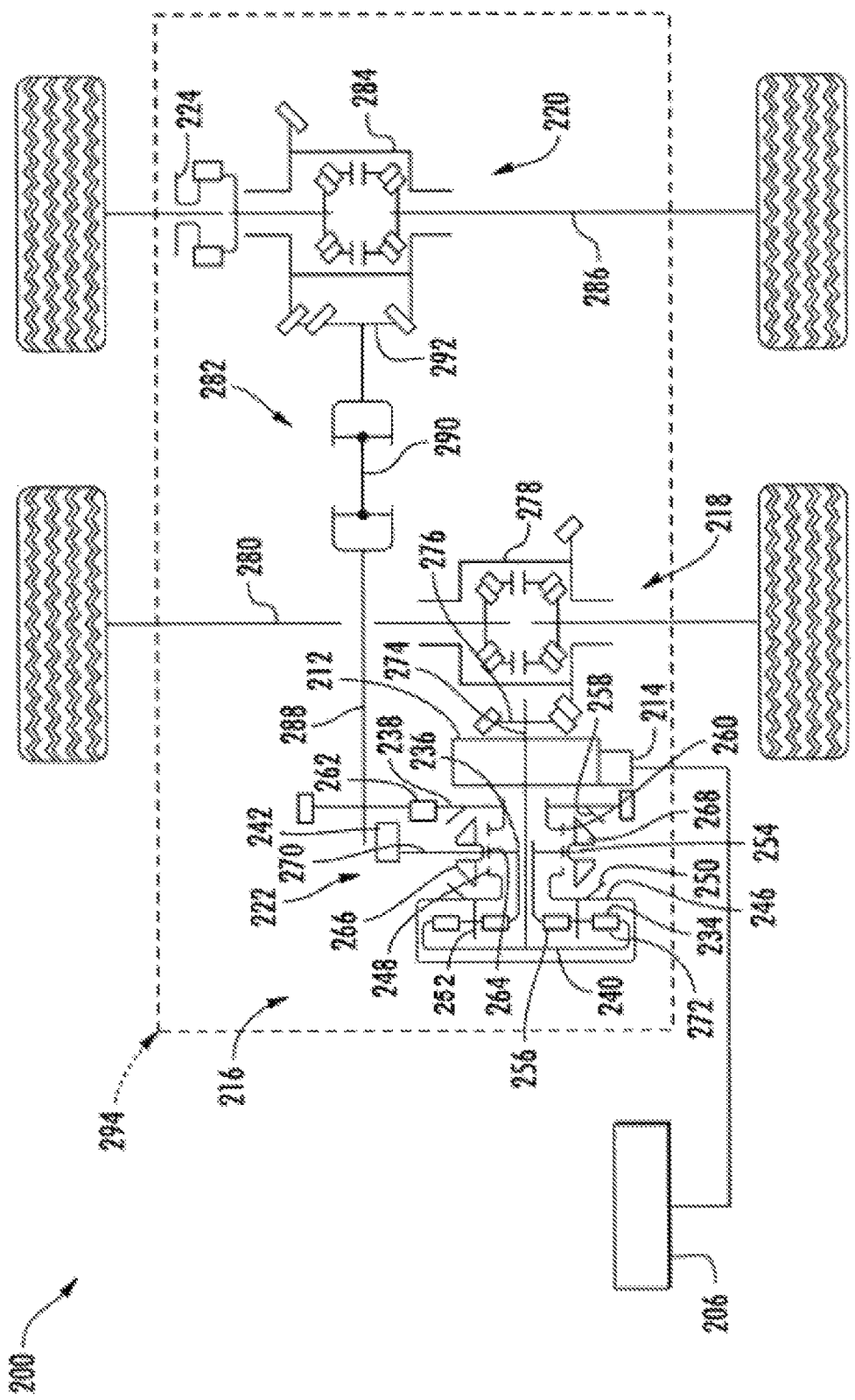
FIG. 2 is a schematic style view of an electric drivetrain according to another preferred embodiment.

FIG. 2 depicts an electric driveline 200 according to another preferred embodiment. The electric driveline 200 includes an electric tandem axle drive unit 294 and a battery 206. The battery 206 is in electrical communication with the electric tandem axle drive unit 294. The electric driveline 200 is similar to the electric driveline 100 shown in FIG. 1, with the exception that the electric driveline 200 shown in FIG. 2 includes a variation of the electric tandem axle drive unit 102. The embodiment shown in FIG. 2 includes similar components to the electric driveline 100 illustrated in FIG. 1. Similar features of the variation shown in FIG. 2 are numbered similarly in series. Different and additional features of the variation shown in FIG. 2 can be appreciated by one skilled in the art in view of FIG. 2 and the electric driveline 100 illustrated in FIG. 1.

The electric tandem axle drive unit 294 includes a planetary drive unit 216, a motor-generator 212, a first axle drive assembly 218, and a second axle drive assembly 220. The electric tandem axle drive unit 294 is configured to be placed in at least two modes of operation, depending on a position of a selection clutch 222 of the planetary drive unit 216. In a first mode of operation, the electric tandem axle drive unit 294 operates in a high torque, dual axle mode operation. In a second mode of operation, the electric tandem axle drive unit 294 operates in a low torque, single axle mode operation. As shown in FIG. 2, in some embodiments, the electric driveline 200 includes an axle disconnect clutch 224 forming a portion of the second axle drive assembly 220. In some embodiments, the planetary drive unit 216 is replaced with a differential unit, preferably a bevel gear differential unit.

The motor-generator 212 is in driving engagement with the output shaft 274 of the first output gear 240 of the planetary drive unit 216. The motor-generator 212 is in electrical communication with a controller 214 and the battery 206. Depending on an electrical control of the motor-generator 212 using the controller 214, the motor-generator 212 may apply force to or retard the output shaft 274 with which it is drivingly engaged with.

In the 6×4 mode, when the planetary drive unit 216 is functioning as a differential transmission, the motor-generator 212 provides only assist and regeneration functionalities. The motor-generator 212 cannot avail of the planetary ratio in 6×4 mode. Since the motor-generator 212 is not tied to the second axle drive assembly 220, it cannot functionally provide electric synchronization capabilities during the transition from 6×2 mode to 6×4 mode when the drive axles have to be brought up to wheel speed prior to engagement of the disconnect clutch 224 to prevent driveline jerks.

Figure 3:
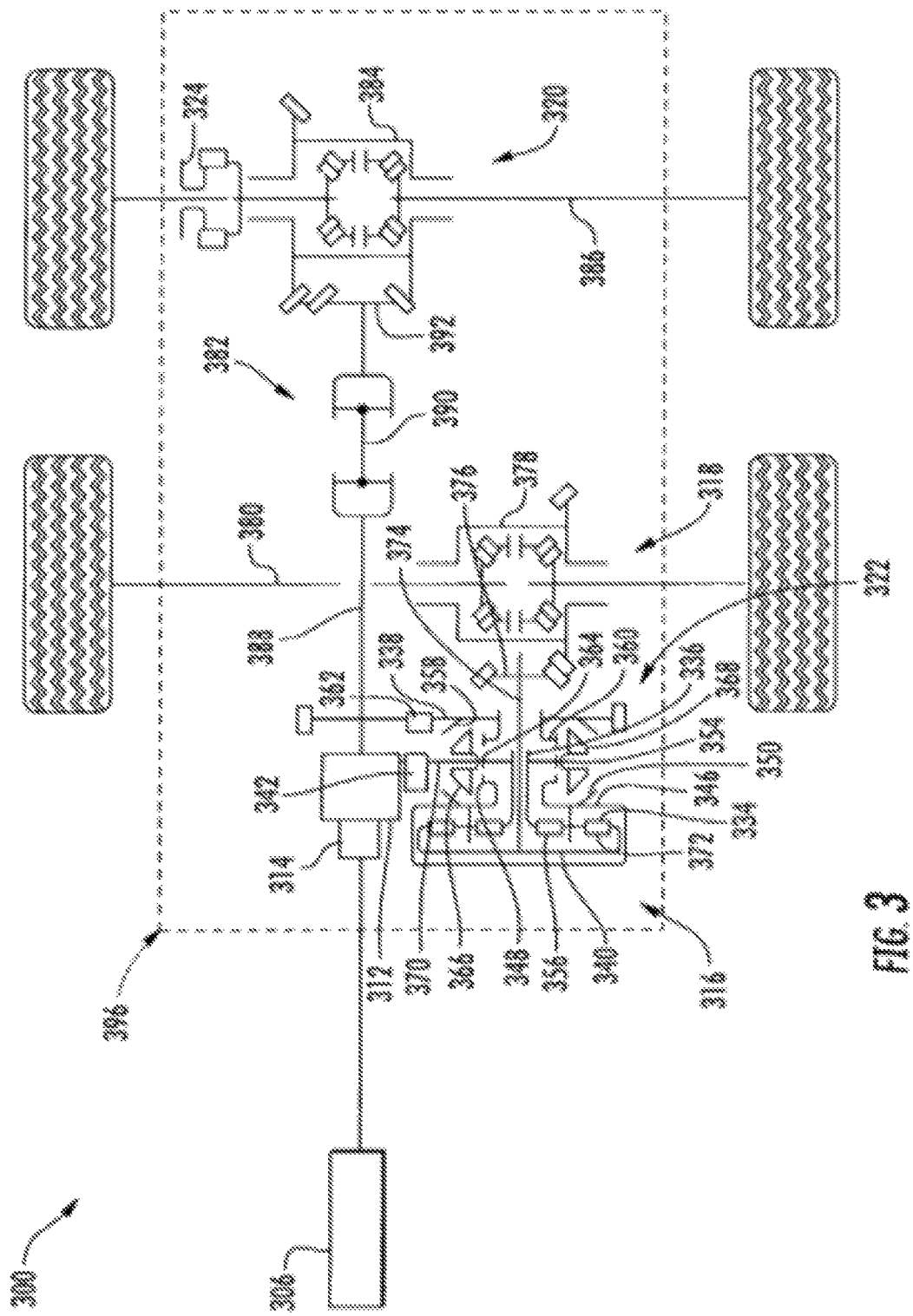
FIG. 3 is a schematic style view of an electric drivetrain according to another preferred embodiment.

FIG. 3 depicts an electric drivetrain 300 according to another preferred embodiment. The electric drivetrain 300 includes an electric tandem axle drive unit 396 and a battery 306. The battery 306 is in electrical communication with the electric tandem axle drive unit 396. The electric drivetrain 300 is similar to the electric driveline 100 shown in FIG. 1, with the exception that the electric drivetrain 300 shown in FIG. 3 includes a variation of the electric tandem axle drive unit 102. The embodiment shown in FIG. 3 includes similar components to the electric driveline 100 illustrated in FIG. 1. Similar features of the variation shown in FIG. 3 are numbered similarly in series. Different and additional features of the variation shown in FIG. 3 can be appreciated by one skilled in the art in view of FIG. 3 and the electric driveline 100 illustrated in FIG. 1.

The electric tandem axle drive unit 396 includes a planetary drive unit 316, a first axle drive assembly 318, a motor-generator 312, and a second axle drive assembly 320. The electric tandem axle drive unit 396 is configured to be placed in at least two modes of operation, depending on a position of a selection clutch 322 of the planetary drive unit 316. In a first mode of operation, the electric tandem axle drive unit 396 operates in a high torque, dual axle mode operation. In a second mode of operation, the electric tandem axle drive unit 396 operates in a low torque, single axle mode operation. As shown in FIG. 3, in some embodiments, the electric driveline 300 includes an axle disconnect clutch 324 forming a portion of the second axle drive assembly 320. In some embodiments, the planetary drive unit 316 is replaced with a differential unit, preferably a bevel gear differential unit.

The motor-generator 312 is in driving engagement with a geared shaft 388 of an inter-axle assembly 382 of the second axle drive assembly 320. The motor-generator 312 is in electrical communication with a controller 314 and the battery 306. Depending on an electrical control of the motor-generator 312 using the controller 314, the motor-generator 312 may apply force to or retard the geared shaft 388 with which it is drivingly engaged with.

In the 6×4 mode, when the planetary drive unit 316 is functioning as a differential transmission, the motor-generator 312 provides assist and regen functionalities. The motor-generator 312 can neither avail of the planetary ratio in 6×4 mode, nor avail of the step gear ratio available at the gear teeth 362 for torque multiplication. In some embodiments, the selection of a proper sizer step gear ratio provides an offset-axis mount ability for the motor-generator 312. Since the motor-generator 312 is directly tied to the second axle drive assembly 320, it provides ideal electric speed synchronization capabilities during the transition from 6×2 mode to 6×4 mode when the second drive axle has to be brought up to wheel speed prior to engagement of the disconnect clutch 324 to prevent driveline jerks.

Figure 4:
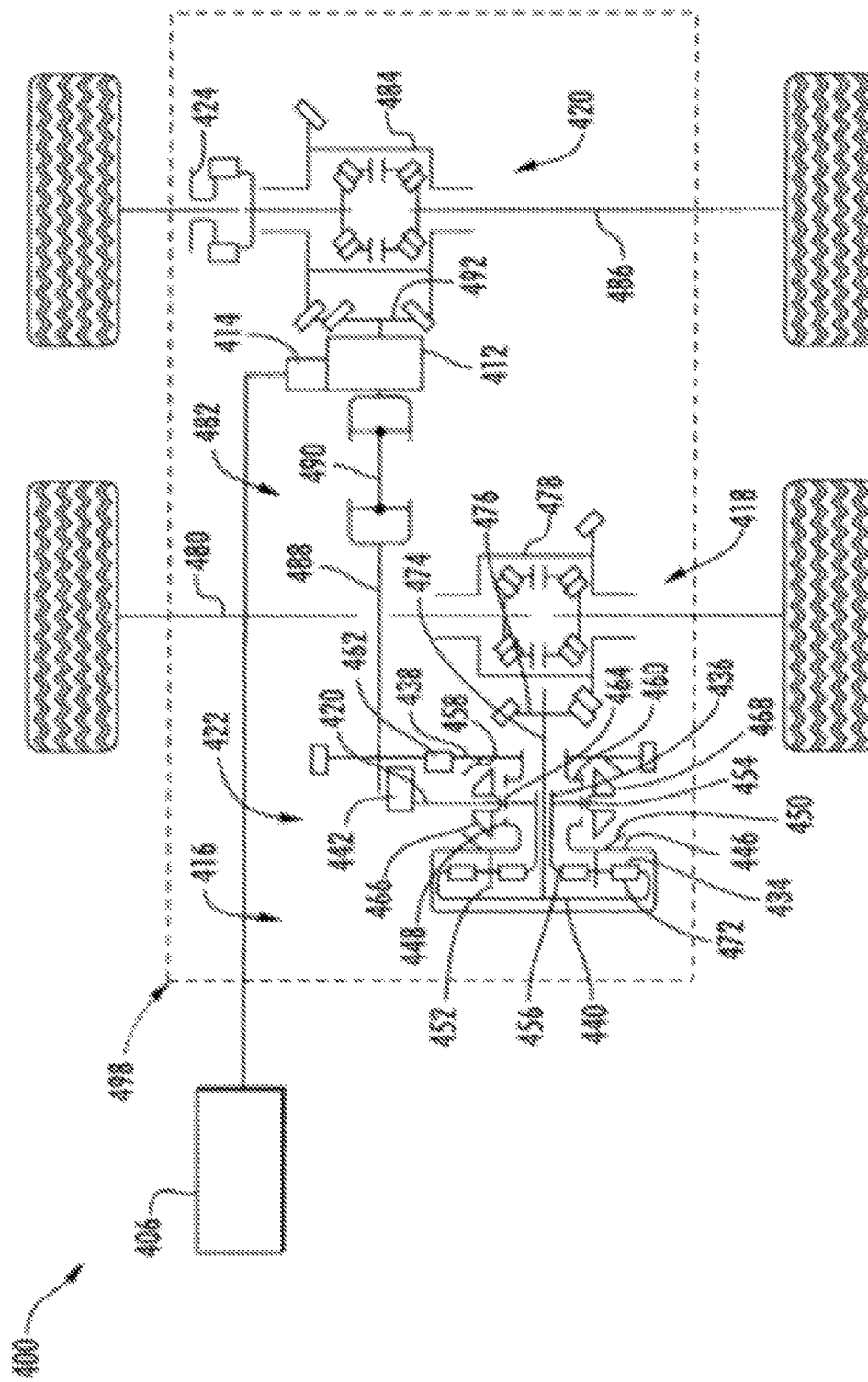
FIG. 4 is a schematic style view of an electric drivetrain according to another preferred embodiment.

FIG. 4 depicts an electric drivetrain 400 according to a preferred another embodiment. The electric drivetrain 400 includes an electric tandem axle drive unit 498 and a battery 406. The battery 406 is in electrical communication with the electric tandem axle drive unit 498. The electric drivetrain 400 is similar to the electric driveline 100 shown in FIG. 1, with the exception that the electric drivetrain 400 shown in FIG. 4 includes a variation of the electric tandem axle drive unit 102. The preferred embodiment shown in FIG. 4 includes similar components to the electric driveline 100 illustrated in FIG. 1. Similar features of the variation shown in FIG. 4 are numbered similarly in series. Different and additional features of the variation shown in FIG. 4 can be appreciated by one skilled in the art in view of FIG. 4 and the electric driveline 100 illustrated in FIG. 1.

The electric tandem axle drive unit 498 includes a planetary drive unit 416, a first axle drive assembly 418, a motor-generator 412, and a second axle drive assembly 420. The electric tandem axle drive unit 498 is configured to be placed in at least two modes of operation, depending on a position of a selection clutch 422 of the planetary drive unit 416. In a first mode of operation, the electric tandem axle drive unit 498 operates in a high torque, dual axle mode operation. In a second mode of operation, the electric tandem axle drive unit 498 operates in a low torque, single axle mode operation. As shown in FIG. 4, in some embodiments, the electric driveline 400 includes an axle disconnect clutch 424 forming a portion of the second axle drive assembly 420. In some embodiments, the planetary drive unit 416 is replaced with a differential unit, preferably a bevel gear differential unit.

The motor-generator 412 is in driving engagement with a second axle drive pinion 492 of an inter-axle assembly 482 of the second axle drive assembly 320. The motor-generator 412 is in electrical communication with a controller 414 and the battery 406. Depending on an electrical control of the motor-generator 412 using the controller 414, the motor-generator 412 may apply force to or retard the second axle drive pinion 492 with which it is drivingly engaged with.

In the 6×4 mode, when the planetary drive unit 416 is functioning as a differential transmission, the motor-generator 412 provides assist and regen functionalities. The motor-generator 412 can neither avail of the planetary ratio in 6×4 mode nor avail of the step gear ratio available at the gear teeth 462. A properly sizer step gear ratio can provide the offset-axis mount ability for a motor-generator 412 with appropriate dimensions. Since the motor-generator 412 is directly tied to the differential 482, the motor-generator 412 can provide electric speed synchronization capabilities during the transition from 6×2 mode to 6×4 mode when the second rive axle must be brought up to wheel speed prior to engagement of the axle disconnect clutch 424 to prevent driveline jerks. When the clutch 424 is disengaged the motor-generator 412 can neither provide assist nor regen functionalities to the vehicle but can provide speed synchronization capabilities. If the clutch 424 is engaged, the driveline 400 functions as an independent system capable of powering the second axle drive assembly 420.

In use, the electric driveline 100, 200, 300, 400 may be operated in a plurality of operating modes. The electric driveline 100, 200, 300, 400 may be operated in an electric drive mode and a regeneration/braking mode. Further, it is understood that the operating modes described hereinbelow with respect to the electric driveline 100, 200, 300, 400 may be adapted where necessary to utilize the architecture of each to operate in the electric drive mode or the regeneration/braking mode.

In the electric drive mode, the battery 106, 206, 306, 406 serves as the power source for the electric driveline 100, 200, 300, 400 for the vehicle. In the electric drive mode, the motor-generator 112, 212, 311, 412, applies force to the electric driveline 100, 200, 300, 400, causing rotation of at least one of the drive axles 180, 186, 280, 286, 380, 386, 480, 486, depending on a position of the selection clutch 122, 222, 322, 422 and a location of the motor-generator 112, 212, 312, 412, propelling the vehicle. In response to communication from the controller 114, 214, 314, 414, the position of the selection clutch 122, 222, 322, 422 is determined to operate the electric driveline 100, 200, 300, 400 in electric drive mode.

In the regeneration/braking mode, the motor-generator 112, 212, 312, 412 is used to retard the electric driveline 100, 200, 300, 400 for the vehicle to facilitate capturing kinetic energy of the vehicle as electrical power to be stored in the battery 106, 206, 306, 406. The regeneration/braking mode may be used to assist a conventional braking system or may be used to regulate a speed of the vehicle when descending an incline. When the motor-generator 112, 212, 312, 412 is used in the regeneration/braking mode, the selection clutch 122, 222, 322, 422 is placed in a position to facilitate driving engagement between at least one of the drive axles 180, 186, 280, 286, 380, 386, 480, 486 and the motor-generator 112, 212, 312, 412, and the motor-generator 112, 212, 312, 412 retards the electric driveline 100, 200, 300, 400 to capture kinetic energy as electrical power.

The foregoing description details certain embodiments. It will be appreciated, however, that no matter how detailed the foregoing appears in text, the preferred embodiments are practiced in many ways. As is also stated above, it should be noted that the use of particular terminology when describing certain features or aspects of the preferred embodiments should not be taken to imply that the terminology is being re-defined herein to be restricted to including any specific characteristics of the features or aspects of the preferred embodiments with which that terminology is associated.

While preferred embodiments have been shown and described herein, it will be obvious to those skilled in the art that such embodiments are provided by way of example only. Numerous variations, changes, and substitutions will now occur to those skilled in the art without departing from the preferred embodiments. It should be understood that various alternatives to the preferred embodiments described herein could be employed in practicing the preferred embodiments.

I claim:

1. An electric tandem axle, comprising:
   a first drive axle assembly having a first differential assembly and a first drive axle having a first axle output shaft and a second axle output shaft, wherein the first differential assembly is drivingly engaged with the first axle output shaft and the second axle output shaft of the first drive axle;
   a second drive axle assembly having a second drive axle having a first axle output shaft and a second axle output shaft, a second differential assembly drivingly engaged with the first axle output shaft and the second axle output shaft of the second drive axle, and an axle disconnect clutch;
   an inter-axle assembly drivingly connected to the first drive axle assembly and the second drive axle assembly via a Cardan shaft;
   a motor-generator in driving engagement with the first and second drive axle assemblies, wherein the motor-generator is positioned between the Cardan shaft and the axle disconnect clutch;
   a battery coupled to the motor-generator;
   a planetary drive unit including a selection clutch and an input shaft, wherein the planetary drive unit is in driving engagement with the first differential assembly, the inter-axle assembly and the motor-generator, and wherein the input shaft is drivingly engaged with the motor-generator;
   a controller connected to the motor-generator, the selection clutch, and the axle disconnect clutch, wherein the controller is configured to selectively engage and disengage the selection clutch and the axle disconnect clutch; and
   a shift fork disposed in the selection clutch, wherein the shift fork is configured to move the selection clutch along an axis of the input shaft.

2. The electric tandem axle of claim 1, wherein the input shaft includes a pinion carrier, a set of clutch gear teeth, and an engagement portion formed on a side of the pinion carrier.

3. The electric tandem axle of claim 2, wherein the set of clutch gear teeth is formed on the pinion carrier radially inward from the engagement portion.

4. The electric tandem axle of claim 1, wherein the selection clutch includes a first synchronizer ring and a second synchronizer ring.

5. The electric tandem axle of claim 4, wherein the second synchronizer ring is a cone clutch that is used in conjunction with a dog clutch.

6. The electric tandem axle of claim 1, further comprising an actuator drivingly engaged with the shift fork, wherein the actuator is configured to adjust a position of the selection clutch.

7. The electric tandem axle of claim 1, wherein the planetary drive unit includes multiple planetary nodes.

8. The electric tandem axle of claim 1, wherein the inter-axle assembly further includes a geared shaft in driving engagement with an output gear, wherein the Cardan shaft is in driving engagement with the geared shaft, and wherein a drive pinion is in driving engagement with the Cardan shaft.

9. The electric tandem axle of claim 1, wherein the motor-generator is in driving engagement with a second axle drive pinion of the inter-axle assembly of the second axle drive assembly.

10. The electric tandem axle of claim 9, wherein the controller is configured to control the motor-generator to apply force to the second axle drive pinion.

11. The electric tandem axle of claim 9, wherein the controller is configured to control the motor-generator to retard the second axle drive pinion.

12. The electric tandem axle of claim 1, wherein the electric tandem axle is configured to be placed in at least two modes of operation based on a position of the selection clutch.

13. The electric tandem axle of claim 12, wherein a first mode of operation is a dual axle mode operation.

14. The electric tandem axle of claim 13, wherein a second mode of operation is a single axle mode operation.

15. The electric tandem axle of claim 14, wherein the electric tandem axle is operated at a high torque in the first mode of operation, and wherein the electric tandem axle is operated at a low torque in the second mode of operation.

* * * * *